US012684259B2

(12) United States Patent
Chu et al.

(10) Patent No.: US 12,684,259 B2
(45) Date of Patent: Jul. 14, 2026

(54) SYSTEM AND METHOD FOR EVENT-BASED DOUBLE INTEGRAL IMAGING

(71) Applicant: OmniVision Technologies, Inc., Santa Clara, CA (US)

(72) Inventors: Cheng-Wei Chu, Taipei (TW); Guo-Yuan Ma, Taipei (TW); Cheng-Pin Lin, Saratoga, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 6 days.

(21) Appl. No.: 18/976,069

(22) Filed: Dec. 10, 2024

(65) Prior Publication Data

US 2026/0164142 A1     Jun. 11, 2026

(51) Int. Cl.
| | |
|---|---|
| *H04N 25/47* | (2023.01) |
| *H04N 1/21* | (2006.01) |
| *H04N 23/45* | (2023.01) |
| *H04N 23/68* | (2023.01) |
| *H04N 23/81* | (2023.01) |
| *H04N 101/00* | (2006.01) |

(52) U.S. Cl.
CPC ........... *H04N 25/47* (2023.01); *H04N 1/2129* (2013.01); *H04N 1/2141* (2013.01); *H04N 23/45* (2023.01); *H04N 23/683* (2023.01); *H04N 23/81* (2023.01); *H04N 2101/00* (2013.01)

(58) Field of Classification Search
CPC .... H04N 1/2129; H04N 1/2141; H04N 23/45; H04N 23/683; H04N 23/80; H04N 23/81; H04N 25/47
See application file for complete search history.

(56) References Cited

U.S. PATENT DOCUMENTS

| | | | | |
|---|---|---|---|---|
| 2021/0321052 A1* | 10/2021 | Cossairt | ................. | H04N 23/55 |
| 2023/0230212 A1* | 7/2023 | García Capel | ............ | G06T 5/92 |
| | | | | 382/100 |
| 2025/0159376 A1* | 5/2025 | Dai | .................... | H04N 23/6811 |

OTHER PUBLICATIONS

S. Lin et al., "Fast Event-based Double Integral for Real-time Robotics", arXiv:2305.05925v1 [cs.RO], May 10, 2023, 8 pages.
M. Guo et al., "A 3-Wafer-Stacked Hybrid 15MPixel CIS + 1MPixel EVS with 4.6GEvent/s Readout, In-Pixel TDC and On-Chip ISP and ESP Function", IEEE International Solid-State Circuits Conference, vol. 58, No. 11, Feb. 2023, 3 pages.
L. Pan et al., "Bringing a Blurry Frame Alive at High Frame-Rate with an Event Camera", Conference on Computer Vision and Pattern Recognition (CVPR), Jun. 2019, 10 pages.

* cited by examiner

*Primary Examiner* — Daniel M Pasiewicz
(74) *Attorney, Agent, or Firm* — Cozen O'Connor

(57) ABSTRACT

EVS event data may be stored in an event buffer as a plurality of event values, each event value corresponding to a respective event frame of the plurality of event frames. For each event frame, a processor may implement an improved EDI model to update the event-frame count, for each event frame after a first event frame, and only when a current event value is different than an immediately preceding event value: (1) updating a first integral of event data based on the current event value and all preceding event values, and (2) updating a second integral of event data based on at least the first integral of event data and the event frame count, and using at least the second integral of event data, deblurring raw image data to yield a latent deblurred image.

20 Claims, 8 Drawing Sheets

400

700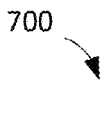

(a) receiving raw image data, captured using an image-generation sensor over an exposure interval — 710

(b) receiving event data, captured using an event-detection sensor over a plurality of event frames, each event frame corresponding to a period of the exposure interval — 720

(c) storing a plurality of event values in an event buffer, each event value corresponding to a respective event frame of the plurality of event frames based on the event data — 730

(d) for each event frame, updating an event-frame count of the plurality of event frames stored in a counter-buffer — 740

(e) when a current event value is different from an immediately preceding event value, (1) updating a first integral of event data using at least the current event value and all preceding event values, and (2) updating a second integral of event data using at least the first integral of event data and the event frame count — 750

(f) using at least the second integral of event data, deblurring the raw image data to yield a latent deblurred image — 760

FIG. 7

SYSTEM AND METHOD FOR EVENT-BASED DOUBLE INTEGRAL IMAGING

BACKGROUND

Since the earliest days of photography, rapidly moving objects have been difficult to film. For example, moving objects filmed with standard CMOS frame-integrated cameras (CIS cameras) often produce blurred images of moving objects due to relative motion of objects in a scene and the camera. Capturing full images at high frame rates can produce motion pictures of moving objects with less blur, but can produce voluminous data, consume significant amounts of power, and pose exposure issues especially in low light levels. Where channels of limited bandwidth are used, such as in battery-operated security cameras transmitting video wirelessly to base stations, transmission of full images at high frame rate can shorten battery life considerably.

Event-based cameras (Event-based Vision Sensor (EVS) or Dynamic Vision Sensor (DVS) cameras) are known, these cameras asynchronously measure and time intensity changes at event detection pixels independently, some with microsecond temporal resolution. Event cameras employ independent pixels that only generate information referred to as "event(s)" in the presence of a brightness change in the scene at a precise moment of such occurrence. A prior pixel value is compared with a current pixel value and an event is recorded when the current pixel value differs from the prior pixel value (e.g., based on detected brightness change, as well as the polarity of the brightness change (binary intensity change in positive or negative signs). Accordingly, the output of an event sensor is not an intensity image but a stream of asynchronous events recorded in high definition temporal resolution (e.g. microsecond), where each event comprises the time at which it is recorded and a position (or an address) of the respective pixel that detected the event. Event cameras are more robust in low lighting situations and highly dynamic scenes than traditional cameras since they are not as affected by under/over exposure or motion blur associated with a synchronous shutter.

The event (EVS) camera works asynchronously in responding to changes of log intensity and triggers time-stamped events whenever the log-scale intensity change exceeds the contrast parameter C>0, i.e., where $\log(L(x, t)) - \log(L(x, tau)) = p \cdot C$, L(x, t) indicates the instantaneous latent image of a pixel at time t, L(x, tau) represents the instantaneous latent image of the pixel location x at time tau, and polarity p is +1 or −1 according to a direction of the intensity change. In some embodiments, each event also includes a magnitude of the intensity change.

Hybrid frame-integrated and event-based cameras are known. These cameras provide a sequence of images, or frames, where light received by each pixel has been integrated over much or all of a frame duration, together with a stream of events observed at pixels between start and end of each frame. The stream of events and sequence of frames can be processed to produce a higher-frame-rate video with an Event-based Double Integral (EDI) method. The EDI method is reported in *"Bringing a Blurry Frame Alive at High Frame-Rate with an Event Camera"* by Liyuan Pan, Cedric Scheerlinck, Xin Yu, Richard Hartley, Miaomiao Liu, and Yuchao Dai, in 2019 IEEE/CVF Conference on Computer Vision and Pattern Recognition (CVPR), June 2019, pp. 6813-6822 (hereinafter the "baseEDI paper").

A "fastEDI" model has been proposed in ". (2023). *"Fast Event-based Double Integral for Real-time Robotics."* by S Lin, Y Zhang, D Huang, B Zhou, X Luo, J Pan, in 2023 IEEE International Conference on Robotics and Automation (ICRA), pp 796-803 (hereinafter the "fastEDI Paper"). In the fastEDI Paper, a new EDI operation flow is proposed. The fastEDI Paper introduces a global addition counter and a list-based container to alleviate the shortcoming of basic EDI operation flow, e.g. the value of $acc_{x,y}(t)$ keeps updating every EVS frame whether the event happens or not. The shortcoming will cause frequent accessing $E_{x,y}(t)$ and $acc_{x,y}(t)$ frame buffers.

In the fastEDI paper, an extra frame buffer of the global counter ($gcnt_{x,y}(t)$) needs to execute the function of the list-based container. But the values of $E_{x,y}(t)$, $gcnt_{x,y}(t)$ and $acc_{x,y}(t)$ change only when an event happens. If the probability of an event happening is lower than 10%, the amount of access time of frame buffers will have more than 90% decrease. It will dramatically reduce the power consumption of EDI operation circuit. However, the high area cost of the global counter frame buffer is a big concern when you implement EDI operation circuit by this method.

SUMMARY OF THE EMBODIMENTS

Embodiments disclosed herein include a method and system for improved Event-based Double Integral imaging and associated image processing and hardware.

BRIEF DESCRIPTION OF THE FIGURES

FIG. 7 is a flowchart of an example method for producing an image using an improved EDI model in an embodiment.

DETAILED DESCRIPTION OF THE EMBODIMENTS

Figure 1:
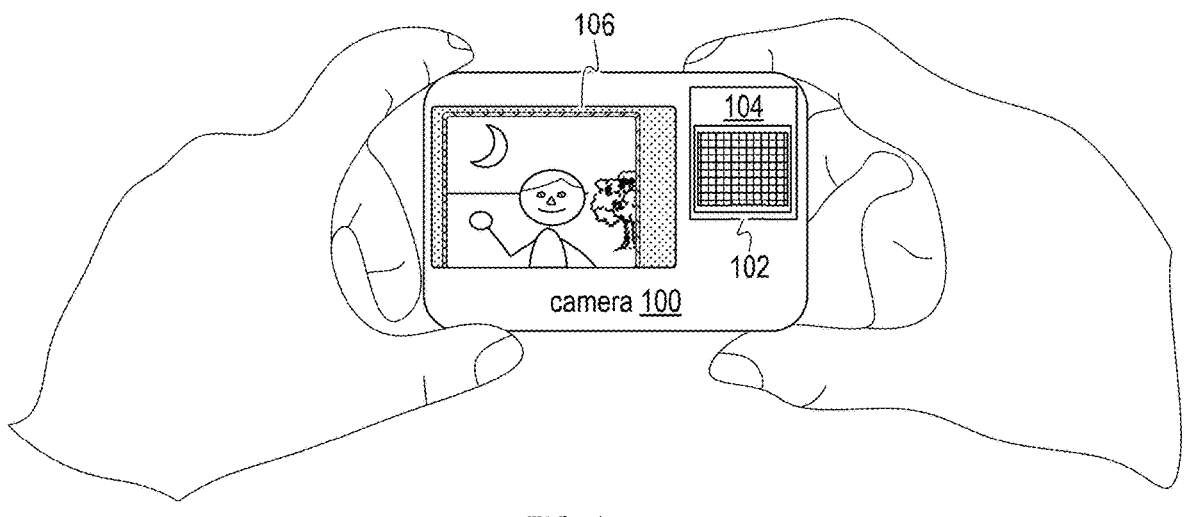
FIG. 1 depicts a camera imaging a scene.
Figure 2:
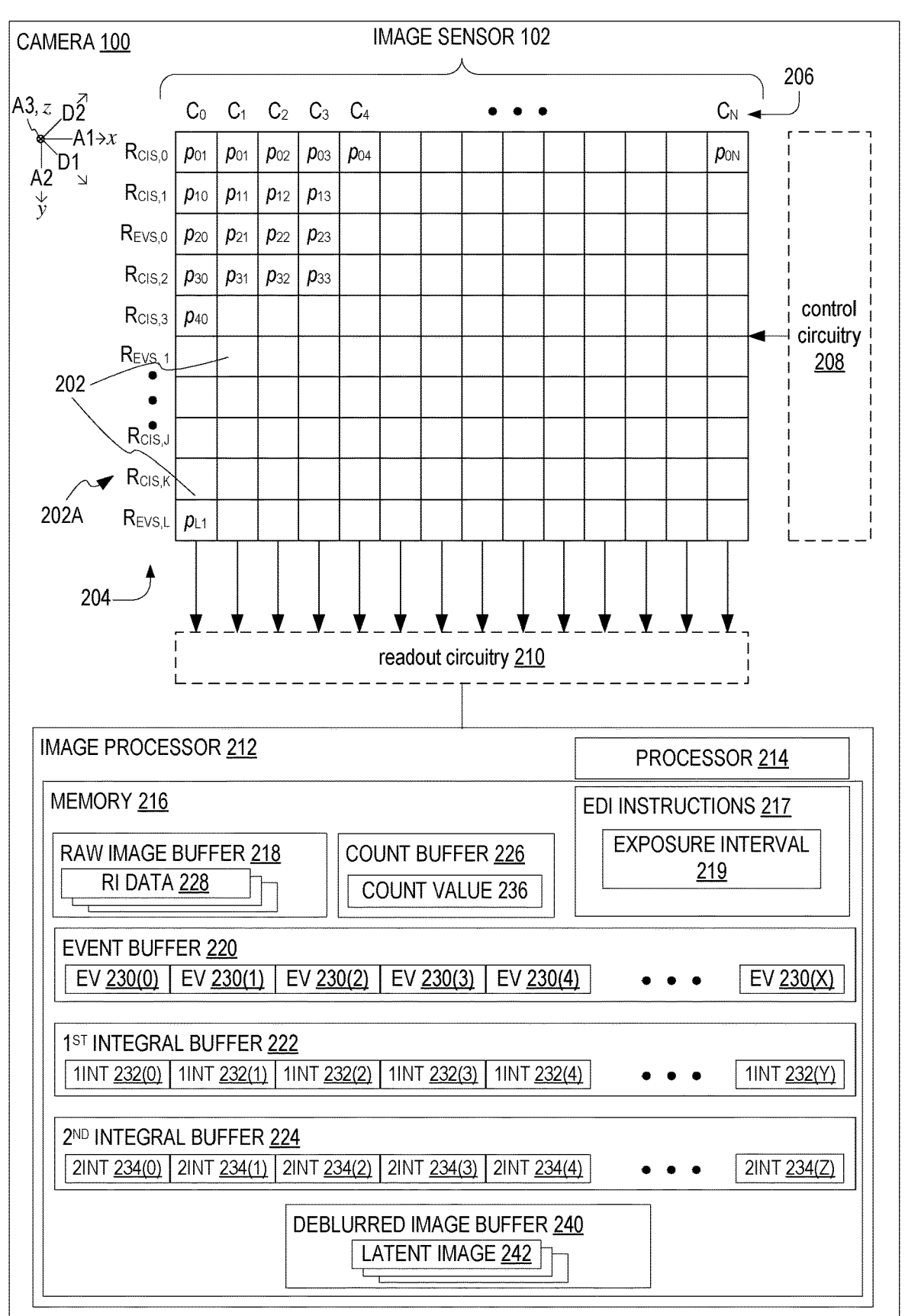
FIG. 2 depicts a block diagram of the camera system of FIG. 1, in embodiments.

FIG. 1 depicts a camera system 100 having a hybrid image sensor 102 and associated image processor 104 providing improved event sensing capability and fully-integrated traditional sensing capability. FIG. 2 depicts a block diagram of camera system 100, in embodiments. FIGS. 1-2 are best viewed together with the following description.

Camera 100 is shown in FIG. 1 as a handheld camera, however it should be appreciated that the camera 100 may be implemented in any form factor, such as an automobile imaging system, smartphone camera, security camera system, computer camera, or any other device implementing the hybrid image sensor 102 and associated image processor 104 discussed herein. Camera 100 is particularly adept at imaging a moving scene 106 by utilizing an improved EDI model and associated image processing and hardware. In particular, the systems and methods described herein address the above deficiencies of the base EDI model and the fastEDI model by incorporating a dedicated counter-buffer and modifying the EDI model to accommodate said dedicated counter-buffer. In at least one embodiment, the counter-buffer is dedicated to pairs of intensity-frame based imaging components (e.g., CMOS Image Sensor (CIS), CCD, or other intensity-based imaging devices) paired with EVS sensor components. The counter-buffer operates as a downcounter, in one non-limiting example (other types of counters may be used in embodiments herein), to obtain the benefit of expedited processing of the EVS-based data as compared to the base EDI model described in the baseEDI paper, while reducing the physical and buffer area as compared to the list-buffer similar to that described in the fastEDI paper. The resulting solution enabled herein provides a cost-efficient, reduced hardware, and expedited processing speed as compared to prior EDI models and associated hardware/firmware/software.

The cross-section illustrated in FIG. 2 is parallel to a plane formed by orthogonal axes A1 and A2, each of which is orthogonal to an axis A3. FIG. 2 also denotes a diagonal axes D1 and D2, each of which may be oriented at 45° with respect to each of axes A1 and A2.

Image sensor 102 includes two-dimensional array of pixels 202 that form a pixel array 202A. Pixel array 202A has L pixel rows 204(1-L) and N pixel columns 206(1-N), which are denoted in FIG. 2 as pixel rows $R_{CIS,0}$, $R_{CIS,1}$, $R_{EVS,0}$, $R_{CIS,2}$, $R_{CIS,3}$, $R_{EVS,1}$, . . . , $R_{CIS,J}$, $R_{CIS,K}$, $R_{EVS,L}$ and pixel columns $C_1$, $C_2$, . . . , $C_N$, respectively. In some embodiments, pixel array 202A may be wider along axis A1 than along axis A2, which may result from N exceeding L. Pixel array 202A may be wider along axis A2 than along axis A1, which may result from L exceeding N. Image sensor 102 may include a semiconductor slab that includes pixel array 202A.

Image sensor 102 is shown as a hybrid CIS/EVS sensor in which some rows-those designated "CIS"—are designated to integrate the received light over an exposure interval. These rows designated "$R_{CIS,\_}$" may be an image-generation subset of an image-generation sensor of the image sensor 102. Moreover, some rows-those designated "EVS"—are to output event data over a plurality of event frames. These rows designated "$R_{EVS,\_}$" may be an event-detection subset of an event-detection sensor of the image sensor 102. A row of event-detection sensors are shown below two adjacent rows of image-generation sensors in FIG. 2. However, other physical relationships between the event-detection sensor(s) and the image-generation sensor(s) are contemplated without departing from the scope hereof. For example, there may be fewer pixels on a given pixel array designated to event-detection functionality as described herein than image-generation pixels on the given pixel array. As another example, the event-detection sensor may be located on a different pixel array than the image-generation sensor but nonetheless spatially corresponding to the image-generation sensor. As yet another example, each corresponding EVS row is shown below a pair of CIS rows, but the EVS row may be above, or between the corresponding CIS rows without departing from scope hereof.

Image sensor 102 may also include at least one of control circuitry 208 and readout circuitry 210. Control circuitry 208 is coupled with pixel array 202A for generating various signals to control operation of each pixel 202. Control circuitry 208 may be electrically connected to each pixel cell of image sensor 102. After each pixel 202 has acquired its image or event detection charge, the image or event detection charge is read out by readout circuitry 210 through column bitlines and transferred to an image processor 212 for processing herein. Image processor 212 may be integrated with pixel array 202A as a part of an Application-Specific Integrated Circuit (ASIC), or may be a separate image processor on its own circuit. Furthermore, image processor 212 may be implemented with discrete logic hardware without departing from the scope hereof.

Each pixel 202 is denoted as $p_{CIS,ab}$, where indices a and b of pixel coordinate (a,b) denote, respectively, the row and column of the pixel within pixel array 202A. Furthermore, the designation CIS or EVS indicates the functionality (either image-generating if "CIS", or event-detecting if "EVS") implemented by the pixels within that row. In embodiments, control circuitry 208 operates to synchronize an exposure interval 217 in which the CIS pixels are exposed with the timing of exposure for the EVS pixels.

Image processor 212 includes a processing device 214, and memory 216 which may store non-transitory computer readable instructions 217 that, when executed by processing device 214 cause the 212 to implement the functionality discussed herein. For example, the computer readable instructions 217 may implement an improved EDI model that improves the camera system 100 to achieve the advantages discussed herein over the baseEDI, fastEDI and other image-processing algorithms known in the art.

In one particular, non-limiting, example of system 100, the image sensor 102 is a hybrid CIS/EVS having CIS pixels co-located with EVS pixels as described in M. Guo et al., "A Three-Wafer-Stacked Hybrid 15-MPixel CIS+1-MPixel EVS With 4.6-GEvent/s Readout, In-Pixel TDC, and On-Chip ISP and ESP Function," in IEEE Journal of Solid-State Circuits, vol. 58, no. 11, pp. 2955-2964 November. 2023, doi: 10.1109/JSSC.2023.3303154 (hereinafter "Hybrid CIS/EVS Paper") and incorporated by reference herein. In other words, the pixels pixel 202 may include features described with respect to FIG. 5.1.1. of the Hybrid CIS/EVS Paper; control circuitry 208 may include features described with respect to FIG. 5.1.2 of the Hybrid CIS/EVS Paper; and image processor 212 may include features described with respect to FIG. 5.1.3 of the Hybrid CIS/EVS Paper. It should be appreciated that these are examples of the image sensor 102, and the image sensor 102 discussed herein is not limited to only the embodiments described in the Hybrid CIS/EVS Paper.

Processing device 214 represents any type of circuit or integrated circuit capable of performing logic, control, and input/output operations. For example, processing device 214 may include one or more of a microprocessor with one or more central processing unit (CPU) cores, a graphics processing unit (GPU), a digital signal processor (DSP), a field-programmable gate array (FPGA), a system-on-chip (SoC), a microcontroller unit (MCU), and an application-specific integrated circuit (ASIC). Processing device 214 may also include a memory controller, bus controller, and other components that manage data flow between processing device 214 and memory 216, and associated inputs and outputs thereof.

Memory 216 may include a raw image data buffer 218, an event buffer 220, a first-integral buffer 222, and a second-integral buffer 224, and a counter buffer 226. Each of these buffers may be a component of a larger memory buffer, or may be individual memory devices/buffers without departing from scope hereof. Memory 216 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 216 may be integrated into processing device 214.

Raw image data buffer 218 stores raw image data 228, such as individual pixel level intensity values, generated by the image-generation sensor(s) of image sensor 102. For example, readout circuitry 210 reads intensity values of each pixel 202 designated with "CIS" in image sensor 102 of FIG. 2 as the pixel is exposed to light over an exposure interval, and stores the read-out value as raw image data 228 in raw image data buffer 218. Raw image data 228 may include pixel identifier, intensity value, polarity, and other information necessary as known in the art to reproduce an image therefrom.

Event buffer 220 stores a plurality of event values 230 associated with event-detection sensor(s) of image sensor 102 at a series of event frames. For example, readout circuitry 210 reports at least a pixel identification of one of the EVS pixels in pixel array 202A, a polarity of the change in received light by said EVS pixel, and a timestamp at which the EVS pixel was readout by readout circuitry 210 (e.g., a timestamp of the event). Other event data may be recorded in event buffer 220 in additional or alternative embodiments, such as the magnitude of the event detected by the event-generation sensor(s). The readout event values 230 may be organized as a plurality of event frames (designated by the parentheses, where FIG. 2 shows "0"-"X" event frames as an example), where each event frame corresponds to a period of the exposure interval used to expose each of the image-generating sensor(s). Thus, the event values 230 and event frames allow for a timing of when the event was detected.

In an embodiment, the event value is one of a −1 for a negative change in light intensity detected by the event-detection sensor exceeding a threshold, a 0 for no change in light intensity detected by the event-detection sensor exceeding the threshold, and a +1 for a positive change exceeding the threshold in light intensity detected by the event-detection sensor. However, alternative values may be used to represent events without departing from scope hereof.

First-integral buffer 222 stores, for each event frame in which a currently-processed event value differs from an immediately preceding event value, a first integral of event data value 232 based on the current event value and all preceding event values preceding the current event value. Identification of when to execute a read/write operation in first-integral buffer 222 may be controlled by non-transitory computer readable instructions 217. This provides the benefit that power consumption associated with accessing and executing a read/write functionality on the first-integral buffer 222 is only expended when the event values 230 change. Thus, while FIG. 2 shows "Y" frames of $1^{st}$ integral of event data value 232, there may be fewer frames stored than total amount of event frames. Thus, Y in first-integral buffer 222 may be less than "X" in event buffer 220. In an example, execution of non-transitory computer readable instructions 217 by processing device 214 determines the $1^{st}$ integral of event data based on E(t) according to equation 1, below.

$$E(t) = \int_0^t e(s)\,ds \qquad \text{Eqn. 1}$$

E(t) describes a relationship between a latent clear image at specific time and the clear image at initial time.

$$L(t) = L(0)*\exp\hat{\ }cE(t) \qquad \text{Eqn. 2}$$

Second-integral buffer 224 stores, for each event frame in which a currently-processed event value differs from an immediately preceding event value, a second integral of event data 234 based on at least the corresponding first integral of event data value 232 (corresponding according to the event frame) and an event frame count (discussed below). Identification of when to execute a read/write operation in second-integral buffer 224 may be controlled by non-transitory computer readable instructions 217. This provides the benefit that power consumption associated with accessing and executing a read/write functionality on the second-integral buffer 224 is only expended when the event values 230 change. Thus, while FIG. 2 shows "Z" frames of 2nd interval event data values 234, there may be fewer frames stored than total amount of event frames. Thus, Z in second-integral buffer 224 may be less than "X" in event buffer 220.

Counter buffer 226 stores an event-frame count 236 of the plurality of event frames. Event frame count 236 is designated for an individual subset of corresponding image-generating sensor (or subset thereof) and event-detection sensor (or subset thereof). For example, there may be an event-frame count 236 designated for row $R_{CIS,0}$, $R_{CIS,1}$, $R_{EVS,0}$, where $R_{CIS,0}$ and $R_{CIS,1}$ collectively form a subset of the image-generation sensor, and $R_{EVS,0}$ forms the corresponding subset of the event-detection sensor. Thus, each three rows in the example image sensor 102 in FIG. 2 show individual subset of corresponding image-generating sensor (or subset thereof) and event-detection sensor (or subset thereof), with one EVS row designated and corresponding to two adjacent CIS rows. In an embodiment, the event-frame count 236 is executed as a downcounter, where each iteration of analysis of the given frame, the event-frame count 236 is decremented from a max frame count to zero. However, other counter methods may be implemented within the scope hereof, such as where the frame count 236 is incrementally increased the frame count from zero to a max frame count.

After determination of the $2^{nd}$ integral event data values 234, non-transitory computer readable instructions 217 may operate to reconstruct one or more latent images 242 and store them in a deblurred image buffer 240. In embodiments, the one or more latent image 242 includes at least one image corresponding to the beginning of the exposure interval 217. In additional or alternative embodiments, the one or more latent image 242 includes at least one image each corresponding to a time of an event frame in which an event occurred as indicated by the event data value(s) 230.

A blurry image (B) formed from the collective raw image data 228 readout from the image-generation sensor at the end of exposure interval 219 is modeled as an average value of all clear latent images during the exposure interval 219. Exposure interval 219 may be defined according to non-transitory computer readable instructions 217, or may be defined according to other considerations such as normal image-sensor control/processing. The Event-based Double Integral (EDI) model implemented by non-transitory computer readable instructions 217 describes the relation of a blurry image and an initial clear latent image through the double integral of events.

According to the baseEDI method, the following equations are used for calculating B and the $2^{nd}$ integral in the baseEDI model:

$$B = \frac{1}{T}\int_0^T L(t)dt \qquad \text{Eqn. 3}$$

$$= \frac{L(0)}{T}\int_0^T \exp^{\wedge}(cE(t))dt \qquad \text{Eqn. 4}$$

$$= \frac{L(0)}{T}\int_0^T \exp^{\wedge}\left(c\int_0^\tau e(s)ds\right)dt \qquad \text{Eqn. 5}$$

The acc(t) function is defined as the result of 2nd integral in the baseEDI model:

$$acc(t) = \int_0^\tau \exp^{\wedge}(cE(s))ds \qquad \text{Eqn. 6}$$

The baseEDI operation double integrates the EVS event data through the entire CIS frame exposure period, using it with the blurry image output from an image-generating sensor to restore a clear image at a beginning of the exposure time, which can then be updated with partially-integrated event data at the EVS frame rate to provide video at the EVS frame rate.

$$L(0) = BT * \left(\int_0^T \exp^{\wedge}(cE(t))dt\right)^{-1} = BT * acc(T)^{-1} \qquad \text{Eqn. 7}$$

In the present EDI model, implemented by non-transitory computer readable instructions 217, to simply implementation of EDI operation circuit, the base of the exponential is changed to base 2, producing the equations, where equation 8 is the first integral calculation used to generate each 1st integral of event data value 232, equation 9 defines an example of the $2^{nd}$ integral calculation used to generate each $2^{nd}$ event data value 234, and equation 10 is then used to generate latent images 242:

$$E(t) = \int_0^\tau e(s)ds \qquad \text{Eqn. 8}$$

$$acc(t) = \int_0^\tau 2^{\wedge}(c'E(s))ds \qquad \text{Eqn. 9}$$

$$L(0) = BT' * \left(\int_0^T 2^{\wedge}(c'E(t))dt\right)^{-1} = BT' * acc(T)^{-1} \qquad \text{Eqn. 10}$$

The system shown in FIGS. 1 and 2, and the method implemented by non-transitory computer readable instructions 217 therefore improves the EDI operation thus reducing the processing time associated with EDI model, and reducing the hardware area used to implement said EDI operation. In embodiments, the hardware area reduction is realized using a downcounter as event-frame count 236 for each event frame determination. The event-frame count 236 may be shared among a plurality of separate individual subsets of corresponding image-generating sensor (or subset thereof) and event-detection sensor (or subset thereof) where the separate individual subsets have identical timing (e.g., event frame count 236 and exposure interval 219). The count value 236 may be determined as follows:

$$\text{dn\_count}(t) = \text{reset?EXP\_FRM\_CNT:dn\_count}(t-1)-1 \qquad \text{Eqn. 11}$$

In this situation, the formula for the $2^{nd}$ interval calculation implemented by non-transitory computer readable instructions 217 (e.g., $acc_{x,y}(t)$) is revised accordingly:

$$\text{acc}(t) = \text{event}(t)! = 0?\text{acc}(t-1) + \text{dn\_count}(t)* $$
$$(2^{c'E(t)} - 2^{c'E(t-1)}):\text{acc}(t-1) \qquad \text{Eqn. 12}$$

where c' is a contrast threshold that defines whether an event occurs in the event data, t is the frame count, and E(t) is the first integral of event data. In one embodiment, if the intensity change in log scale is larger than the contrast threshold (c), it will trigger an event; if $c < \log(L(t)/L(t\_ref)) \rightarrow$ event. In another embodiment, the intensity change is detected in $\log_2(\ )$ scale. Then if $C' < \log_2(L(t)/L(t\_ref)) \rightarrow$ event. The corresponding contrast threshold in $\log_2(\ )$ scale will be labeled as c', such as in equation 12 above. The conversion between c and c' may be described as the following equation.

$$L(t)/L(t\_ref) = \exp^{\wedge}c = 2^{\wedge}c' \rightarrow c' = \log_2(\exp^{\wedge}C) = C*\log_2 \text{(exp)}$$

Thus, when an event doesn't happen (e.g., the event value event values 230 of a current event frame is not different than the event value 230 of the immediately preceding event frame), the values of the first integral (e.g., $E_{x,y}(t)$) and the second integral (e.g., $acc_{x,y}(t)$) don't change as time (t) increments. Not accessing and implementing a read/write operation on the $1^{st}$ and $2^{nd}$ interval buffers 222, 224, respectively, under these conditions could greatly reduce frame buffers access time and reduces power consumption for the image processor 212.

As discussed above, each subset of event-detection sensor only needs one count value 236 (whether it is a down counter, or another type of counter). While this requires processing pixels without changes on a line where other pixels reported changes, one down counter for a line consumes far less hardware or memory space than does a counter for each pixel, such as the global counter described in the fastEDI model.

Using a down counter as the count value 236 for each event-sensor subset, dn_count(t), records how many event frames remain in a currently-processed exposure interval 219.

Figure 3:
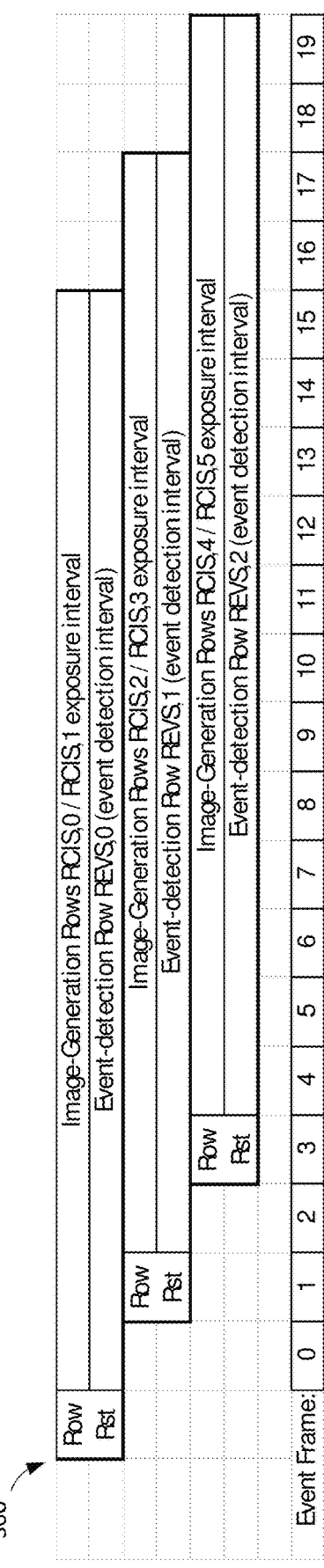
FIG. 3 shows a working example of relationship between the event frames associated with count buffer and exposure interval of FIG. 2, in embodiments.

FIG. 3 shows a working example of relationship 300 between the event frames associated with count buffer 226 and exposure interval 219, in embodiments. Relationship 300 illustrates that image-generation sensor subset of rows $R_{CIS,0}, R_{CIS,1}$ c of image sensor 102 of FIG. 2 correspond to event-detection sensor subset of rows $R_{EVS,0}$. Row RST in relationship 300 is representative of control circuitry 208. Relationship 300 shows an embodiment where exposure timing of each individual grouping image-generation sensor subset and event-detection sensor subsets are staggered, and each stagger interval is the same. Moreover, each individual grouping image-generation sensor subset and event-detection sensor subset are defined by 16 event frames (0-15). Thus, in an example of event-frame count 236, "EXP_FRM_CNT" in equation 11 would be "16". The ratio of event frames to exposure interval may vary according to the specific application and embodiments with a frame count of 4, 8, 16, 32, or 64 EVS frame times are contemplated without departing from scope hereof. While a ratio of event frame count to exposure interval that is a power of 2 are convenient for implementation, ratios greater than 2 and less than or equal to 64 that are not a power of 2, such as 12 or 18, may be used in other embodiments.

Figure 4:
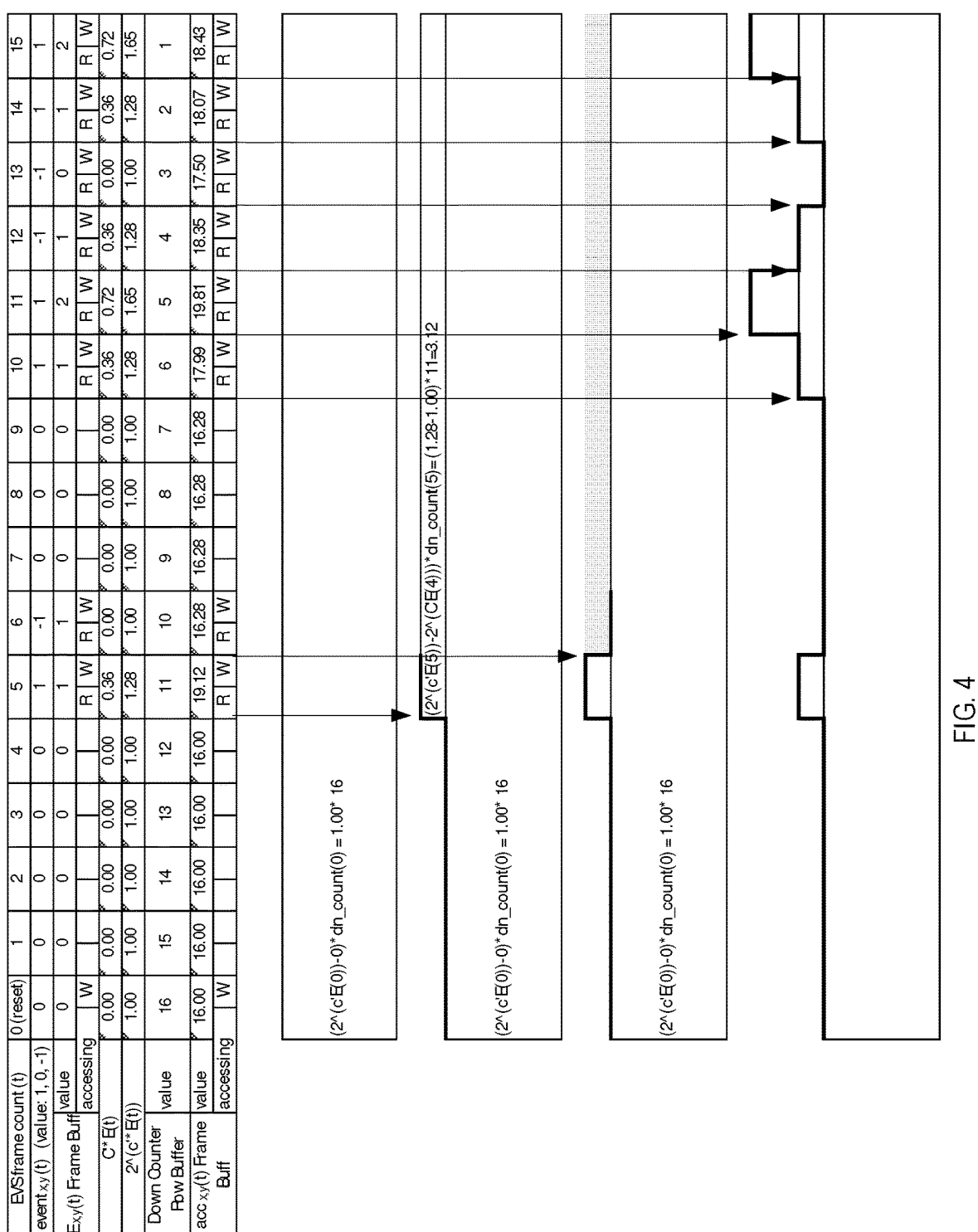
FIG. 4 shows a working example of relationship showing timing, read/write access required for the buffers (e.g., event buffer, first-integral buffer, second-integral buffer, and counter buffer, and associated values of 1st integral of event data values and 2nd integral of event data values of FIG. 2), in an embodiment.

FIG. 4 shows a working example of relationship 400 showing timing, read/write access required for the buffers (e.g., event buffer 220, first-integral buffer 222, second-integral buffer 224, and counter buffer 226, and associated values of $1^{st}$ integral of event data values 232 and $2^{nd}$ integral of event data values 234 of FIG. 2, in an embodiment.

In relationship 400, it is established that the first-integral buffer 222 is only accessed during event frames 0, 5, 6, and 10-15 because these are the frames in which an event is identified according to the event values. The bottom portion of relationship 400 illustrates a hypothetical "expectation area" according to the end of the exposure period based on the event data received in frames 0-15. When an event occurs in the associated event frame, the expectation area is adjusted by dn_count(t), previous and current $E_{x,y}(t)$. The value of adjustment is be $dn_{count(t)}*(2^{c'E(t)}-2^{c'E(t-1)})$. According to the relationship 400, an event at time/event frame "t" implements the following:

event(t)=1, $E_{x,y}(t)$ increases, expectation area increases.

event(t)=−1, $E_{x,y}(t)$ decreases, expectation area decreases.

event(t)=0, $E_{x,y}(t)$ doesn't change, expectation area doesn't change

Relationship 400 represents the benefit achieved by the systems and methods herein. When an event doesn't happen (event(t)=0), the values of both the first integral ($E_{x,y}(t)$) and the second integral ($acc_{x,y}(t)$) don't change and the associated first-integral buffer 222 and second-integral buffer 224 are not accessed (represented by an "R" for read and a "W" for write in relationship 400). Thus, the power consumption is saved because these operations are not performed. Moreover, counter row illustrates the counter buffer 226 establishing the less physical area as compared to the global frame buffer in the fastEDI model. It should be appreciated that although relationship 400 shows a downcounter, other row counters for each EVS line could be implemented, such as decreasing from EXP_FRM_CNT−1 to 0; or increasing from 0 to EXP_FRM_CNT−1. The second integral value calculation would be revised (e.g., revision of formula of acc(t)) as necessary to accommodate these alternate counter embodiments.

Figure 5:
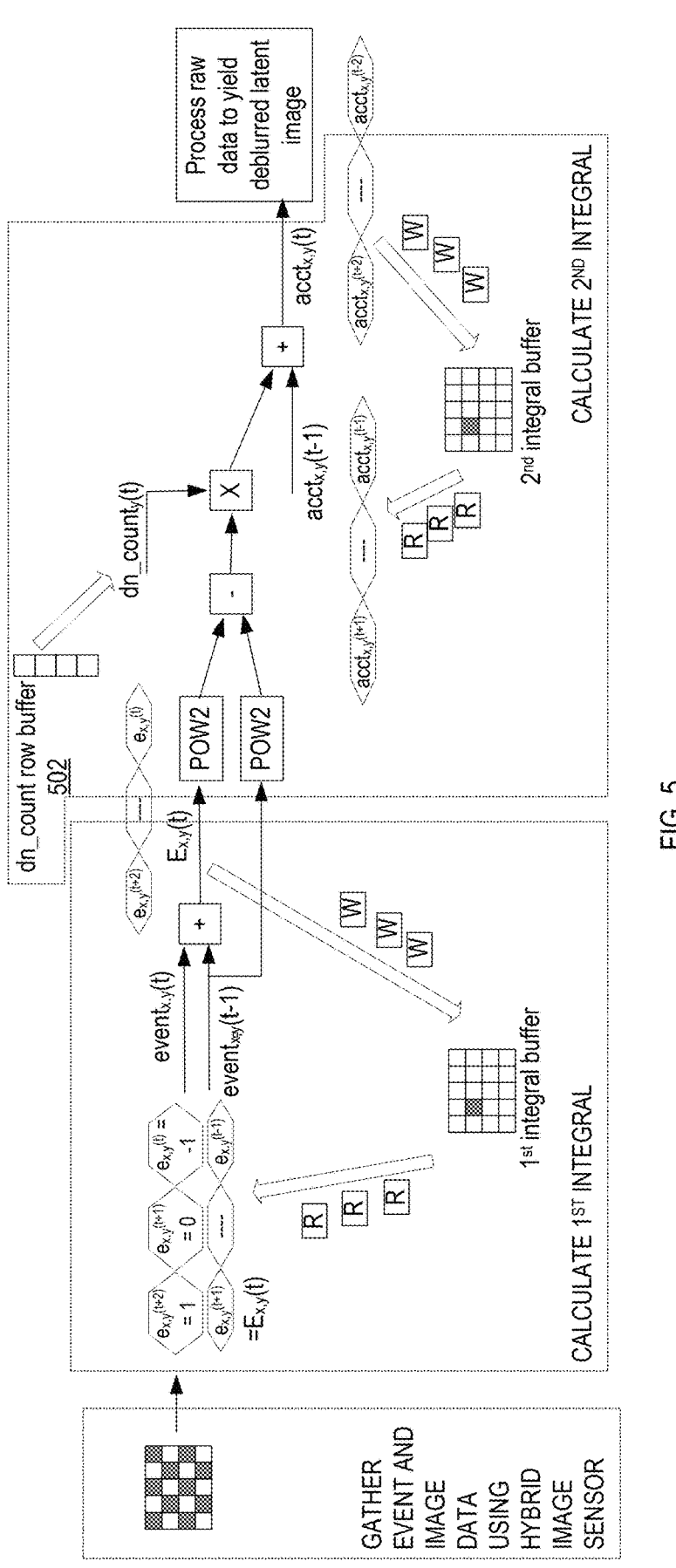
FIG. 5 shows an example flow diagram of data as represented by system of FIGS. 1-2 and the methods implemented thereby as discussed herein.

FIG. 5 shows an example flow diagram 500 of data as represented by system 100 and the methods implemented thereby as discussed herein. Starting left to right, event and image data is generated via a hybrid image sensor (such as image sensor 102 discussed above). An image processor (e.g., image processor 212 including processing device 214 executing non-transitory computer readable instructions 217) then calculates a $1^{st}$ integral of the event data only when the event value (e.g., event data value 230 discussed above) indicates an event occurred in the corresponding event frame. The image processor then calculates a second integral based on the $1^{st}$ integral and frame count. In flow diagram 500 shows logic according to equation 12, above. The second integral is then used by the image processor to process the raw image data to generate latent images according to equation 10, above. This flow may be repeated for additional frames of raw image data to produce high-resolution clear images accumulated as an improved video feed.

Figure 6:
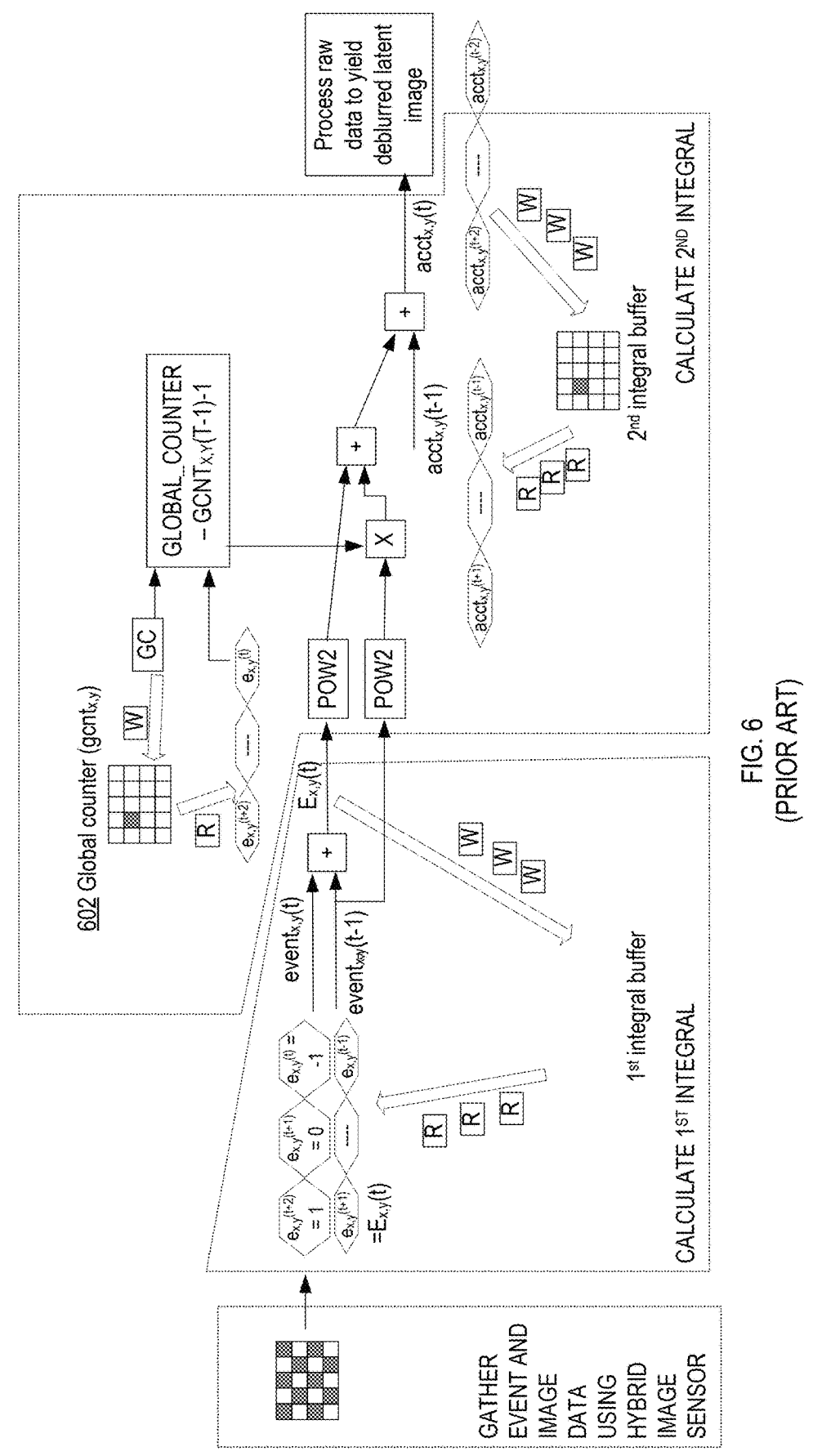
FIG. 6 is example flow diagram of the prior art fastEDI model, emphasizing the disadvantage thereof via the required global counter.

FIG. 6 is example flow diagram 600 of the prior art fastEDI model, emphasizing the disadvantage thereof via the required global counter. Comparing flow diagram 600 to flow diagram 500, In the fastEDI method, an extra frame buffer of global counter is needed. When an event of pixel ($event_{x,y}$) happens at time $t_i$, the fastEDI model updates the value of the event pixel's corresponding element ($gcnt_{x,y}$) in the global counter's 602 frame buffer to the value of global counter GC($t_i$), (e.g., $gcnt_{x,y}$=GC($t_i$)). When another event happens on the same pixel ($event_{x,y}$) at time $t_j$, the fastEDI model represented by diagram 600 retrieves the event pixel's previous value of the global counter 602 the corresponding frame buffer. The $2^{nd}$ integral equation is used to calculate the increment of the $2^{nd}$ integral of EDI, Acc(t) between two events of a pixel that happened at time $t_i$ and $t_j$. Each pixel has its independent event sequence, so in the fastEDI model, a frame buffer is needed for every pixel in a frame to store the value of global counter 602 when an event happens at its location.

Comparing to the diagram 500, in the present embodiments using the down counter 502 (which is an example of, and represent, count buffer 226 and count value 236), the pixels in one row of the image sensor can share one down counter. So, the present embodiments utilize a smaller hardware cost compared to the hardware cost of the fastEDI model. Furthermore, because of the global counter 602 frame buffer in the fastEDI method, the fastEDI model requires additional access (read/write) operations to global counter 602 when an event of a pixel is detected. Therefore, the proposed embodiments also speed up the EDI model as compared to the fastEDI model by utilizing the downcounter or row-specific counter system (e.g., counter 502 and/or 226 and count value 236) represented by FIGS. 1-5 herein.

FIG. 7 is a flowchart of an example method 700 for producing an image using an improved EDI model. Method 700 may be implemented using the system 100 described above with respects to FIGS. 1-5, including via execution of non-transitory computer readable instructions 217 by processing device 214 of image processor 212.

At step 710, method 700 includes (a) receiving raw image data, captured using an image-generation sensor over an exposure interval. In an example of step 710, raw image data 228 is generated using one or more pixels 202 associated an image-generating sensor, such as Rows designated "CIS" in the pixel array 202A of image sensor 102.

At step 720, method 700 includes (b) receiving event data, captured using an event-detection sensor over a plurality of event frames, each event frame corresponding to a period of the exposure interval. In an example of step 720, event data is generated using one or more pixels 202 associated with an event-detection sensor, such as Rows designated "EVS" in the pixel array 202A of image sensor 102.

At step 730, method 700 includes (c) storing a plurality of event values in an event buffer, each event value corresponding to a respective event frame of the plurality of event frames based on the event data. In an example of step 720, event values 230 are stored in event buffer 220 as discussed above.

At step 740, method 700 includes (d) for each event frame, updating an event-frame count of the plurality of event frames stored in a counter-buffer. In one example of operation of step 740, event-frame count 236 within counter buffer 226 is updated at each iteration of processing associated with the event frames. In one example of step 740, updating an event-frame count comprises incrementally decreasing the frame count from a max frame count to zero. In another example of step 740, updating the frame count comprises incrementally increasing the frame count from zero to a max frame count.

At step 750, method 700 includes (e) when a current event value is different from an immediately preceding event value, (1) updating a first integral of event data using at least the current event value and all preceding event values, and (2) updating a second integral of event data using at least the first integral of event data and the event frame count. In one example of operation of step 750, when a current event value 230 indicates that an event has been detected by the event-detection sensor for the event frame being processed, $1^{st}$ integral of event data value 232 and $2^{nd}$ integral of event data value 234 are calculated and stored in first-integral buffer 222 and second-integral buffer 224, respectively. The $1^{st}$ integral of event data value 232 may be calculated according to equation 8, and the $2^{nd}$ integral of event data value 234 may be calculated according to equation 9 and/or 12 above.

At step 760, method 700 includes (f) using at least the second integral of event data, deblurring the raw image data to yield a latent deblurred image. In one example of operation of step 760, execution of non-transitory computer readable instructions 217 by processing device 214 causes image processor 212 to generate one or more one or more latent images 242 using $2^{nd}$ integral of event data value 234 and raw image data 228. One or more latent image 242 may be calculated using equation 10 above.

Figure 8:
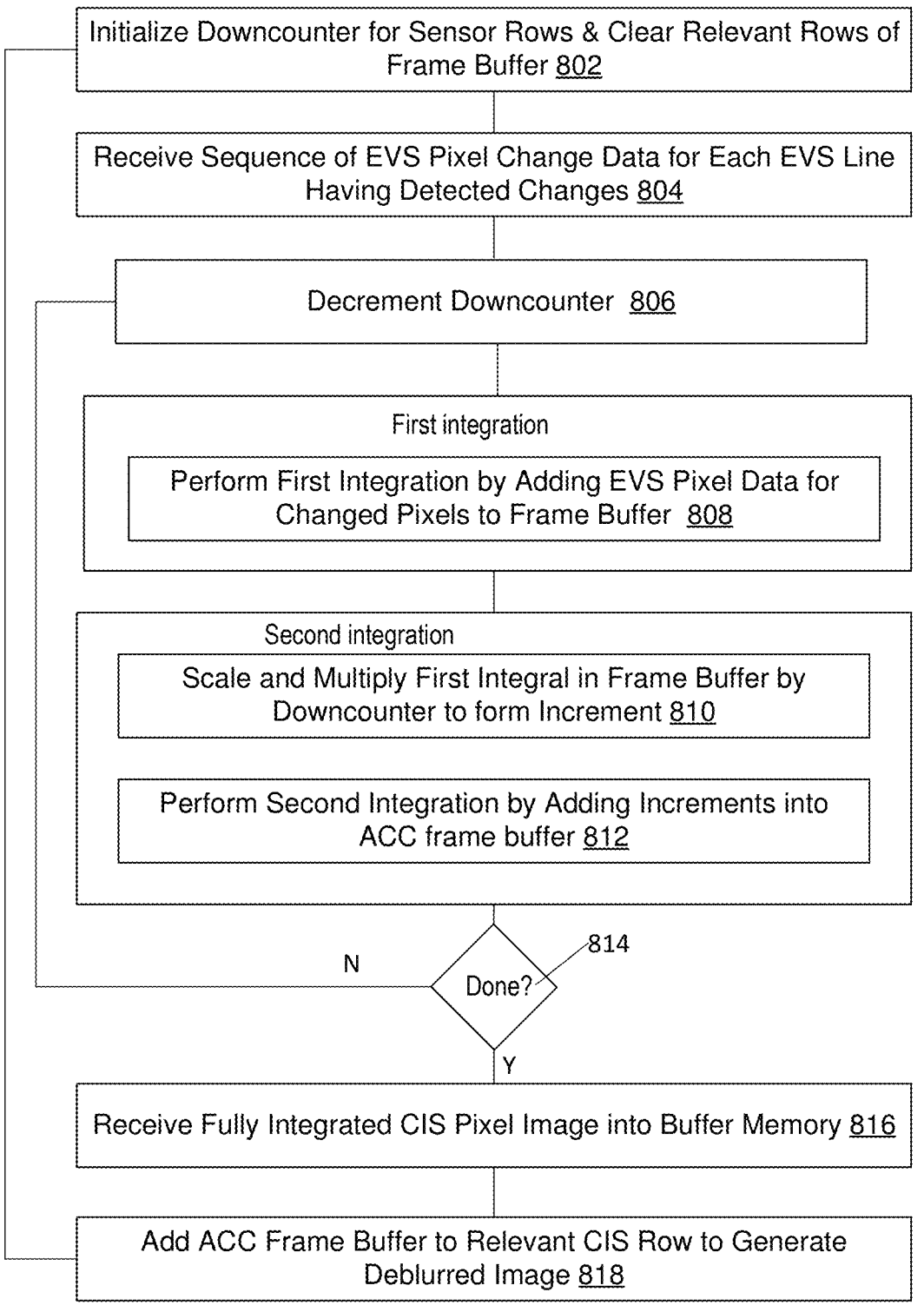
FIG. 8, for example, shows a flowchart of the steps of method of FIG. 7 implemented using a down-counter.

In the method 700, steps b-e may be repeated to analyze each event frame until the count value maximum or minimum is reached. FIG. 8, for example, shows a flowchart 800 of the steps of method 700 with a specific example of a down-counter. The example of flowchart 800 is for events associated with a first row of the EVS pixels (e.g., Row $R_{EVS,0}$ in FIG. 2) and for each first (CIS) frame for that row (e.g., $R_{CIS,0}$ and $R_{CIS,1}$ in FIG. 2). Moreover, at the beginning of each processing instance, a downcounter, the buffers such as event buffer 220, first-integral buffer 222, and second-integral buffer 224 are cleared as shown in block 802. Then, a sequence of event-values are generated for each event frame in block 804, which is an example of step 720 and 730. For each event frame processing iteration, a downcounter may be decremented at block 806, which is an example of step 740. If there are any non-zero events associated with that row in that event frame, the polarity for each reported EVS pixel is added at block 808 to an associated integral of the first integrals in the first integral buffer 222 to perform a first integration, which is an example of step 750(1). Where any non-zero events occurred in the EVS frame, the first integrals from that row of the first frame buffer are scaled, typically by a power of 2, and multiplied at block 810 by the downcounter to produce an increment, the increment being added 812 into the second integral of a second integral buffer, which is an example of step 750(2) of method 700. If there are no non-zero events received during the event frame being processed, blocks 808-812 are skipped to conserve power. This is repeated as indicated by block 814 for all event frames associated with an exposure period as indicated until the downcounter reaches zero at each iteration of block 806. The associated row of CIS frame is received at block 816 (which is an example of step 710 of method 700) and a deblurred image is generated at block 818, which is an example of step 760 of method 700.

While the discussion herein has focused on events based on changes in light intensity, implying a black-and-white event camera, the methods herein described are readily extrapolated to obtaining color images in several ways. For example, one full-color embodiment would use an image sensor having an array of both CIS and EVS pixels as herein described combined with a Bayer-pattern-like red-green-blue color filter array deposited on the image sensor array with each color layer processed by enhanced EDI separately. Another full-color embodiment might have an image sensor having an array of superpixels, each superpixel comprising red, green, and blue pixels, where the pixels of each color are read out separately to provide red, green, and blue CIS image planes, and events are determined on a superpixel basis should any one or more of the red, green, or blue photodiodes of the superpixel detect a change in light intensity exceeding the threshold.

Combinations of Features

Features described above, as well as those claimed below, may be combined in various ways without departing from the scope hereof. The following enumerated examples illustrate some possible, non-limiting combinations.

Example 1. A camera, comprising: an image-generation sensor designated to generate a raw image data based on received light received over an exposure interval; an event-detection sensor spatially corresponding to the image-generation sensor and designated to output event data over a plurality of event frames, each event frame corresponding to a period of the exposure interval; memory defining: an event buffer storing a plurality of event values, each event value corresponding to a respective event frame of the plurality of event frames based on the event data, a first-integral buffer storing first integral of event data based on the event values, a second-integral buffer storing second integral of event data based on the first integral of event data, and a counter-buffer defining an event-frame count of the plurality of event frames; and a processor configured to: for each event frame, update the event-frame count, for each event frame after a first event frame, only when a current event value is different than an immediately preceding event value: (1) executing read/write on the first-integral buffer to update the first integral of event data based on the current event value and all preceding event values, and (2) executing read/write on the second-integral buffer to update the second integral of event data based on at least the first integral of event data and the event frame count, and using at least the second integral of event data, deblurring the raw image data to yield a latent deblurred image.

Example 2. The camera of Example 1, comprising: a pixel array having a plurality of pixels, the image-generation sensor being an image-generation subset of the plurality of pixels each designated to integrate the received light over the exposure interval, the event-detection sensor being an event-detection subset of the plurality of pixels being designated to output event data over the plurality of event frames.

Example 3. The camera of Example 2, the event-detection subset comprising a plurality of event-detection subsets and the image-generation subset comprising a plurality of image-generation subsets, each image-generation subset corresponding to at least one row of the plurality of pixels.

Example 4. The camera of Example 1, the image-generation sensor comprising a plurality of image-generation subsets; the event-detection sensor comprising a plurality of event-detection subsets.

Example 5. The camera of Example 4, wherein each subset of the plurality of event-detection subsets has same event frame quantity; a single count-buffer is used for analysis of event frames corresponding to more than one of the plurality of event-detection subsets.

Example 6. The camera of Example 1, the latent deblurred image corresponding to beginning of the exposure interval.

Example 7. The camera of Example 1, the latent deblurred image including a plurality of latent deblurred images corresponding to respective time of corresponding event frame in which event data value indicates an event occurred.

Example 8. The camera of Example 1, exposure control of the image-generation sensor and the event-detection sensor being synchronized.

Example 9. The camera of Example 1, wherein update the event-frame count comprises incrementally decreasing the frame count from a max frame count to zero.

Example 10. The camera of Example 1, wherein update the frame count comprises incrementally increasing the frame count from zero to a max frame count.

Example 11. A method for producing an image, comprising: (a) receiving raw image data, captured using an image-generation sensor over an exposure interval; (b) receiving event data, captured using an event-detection sensor over a plurality of event frames, each event frame corresponding to a period of the exposure interval; (c) storing a plurality of event values in an event buffer, each event value corresponding to a respective event frame of the plurality of event frames based on the event data; (d) for each event frame, updating an event-frame count of the plurality of event frames stored in a counter-buffer; (e) when a current event value is different from an immediately preceding event value, (1) updating a first integral of event data using at least the current event value and all preceding event values, and (2) updating a second integral of event data using at least the first integral of event data and the event frame count; and (f) using at least the second integral of event data, deblurring the raw image data to yield a latent deblurred image.

Example 12. The method of Example 11, wherein: the image-generation sensor comprises a plurality of image-generation subsets, and the event-detection sensor comprises a plurality of event-detection subsets; and, a single count-buffer is used for analysis of event frames corresponding to more than one of the plurality of event-detection subsets.

Example 13. The method of Example 11, the latent deblurred image corresponding to beginning of the exposure interval.

Example 14. The method of Example 11, the latent deblurred image including a plurality of latent deblurred images each corresponding to respective time of the corresponding event frame.

Example 15. The method of Example 11, further comprising synchronizing exposure control of the image-generation sensor and the event-detection sensor.

Example 16. The method of Example 11, updating an event-frame count comprises incrementally decreasing the frame count from a max frame count to zero.

Example 17. The method of Example 11, wherein updating first integral of event data using at least the current event value and all preceding event values comprises: summing the current event value and all preceding event values; wherein each event value is one of a −1 for a negative change in light intensity detected by the event-detection sensor exceeding a threshold, a 0 for no change in light intensity detected by the event-detection sensor exceeding the threshold, and a +1 for a positive change exceeding the threshold in light intensity detected by the event-detection sensor.

Example 18. The method of Example 11, wherein updating the second integral of event data comprises calculating: $acc(t)=event(t)!=0?acc(t-1)+dn\_count(t)*(2^{c'E(t)}-2^{c'E(t-1)}):acc(t-1)$ where c' is a contrast threshold that defines whether an event occurs in the event data, is the frame count, and E(t) is the first integral of event data.

Example 19. The method of Example 11, wherein deblurring the raw image data to yield a latent deblurred image includes, calculating expected intensity value of each pixel in the deblurred image corresponding to time (t) based on $$L(t) = L(0)*\exp^{cE(t)};$$

$$\text{where } L(0) = BT' * \left( \int_0^T 2^{\wedge}(c'E(t))dt \right)^{-1} = BT' * acc(T)^{-1};$$

where BT' is the value of pixel in the raw image data at end of exposure time T', and c' is a contrast threshold, $$acc(t) = \int_0^t 2^{\wedge}(c'E(s))ds, \text{ and } E(t) = \int_0^t e(s)ds.$$

Example 20. The method of Example 11, further comprising repeating (a)-(f) over additional exposure intervals to yield additional latent deblurred images; and combining the latent deblurred image and the additional latent deblurred images into a video stream.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments.

Regarding instances of the terms "and/or" and "at least one of," for example, in the cases of "A and/or B," "at least one of A and B," and "at least one of A or B," such phrasing encompasses the selection of (i) A only, or (ii) B only, or (iii) both A and B. In the cases of "A, B, and/or C," "at least one of A, B, and C," and "at least one of A, B, or C," such phrasing encompasses the selection of (i) A only, or (ii) B only, or (iii) C only, or (iv) A and B only, or (v) A and C only, or (vi) B and C only, or (vii) each of A and B and C. This may be extended for as many items as are listed.

The following claims are intended to cover all generic and specific features described herein, as well as all statements of the scope of the present method and system, which, as a matter of language, might be said to fall therebetween.

We claim:

1. A camera, comprising:
   an image-generation sensor designated to generate a raw image data based on received light received over an exposure interval;
   an event-detection sensor spatially corresponding to the image-generation sensor and designated to output event data over a plurality of event frames, each event frame corresponding to a period of the exposure interval;

memory defining:

an event buffer storing a plurality of event values, each event value corresponding to a respective event frame of the plurality of event frames based on the event data, a first-integral buffer storing first integral of event data based on the event values, a second-integral buffer storing second integral of event data based on the first integral of event data, and a counter-buffer defining an event-frame count of the plurality of event frames; and a processor configured to:

for each event frame, update the event-frame count, for each event frame after a first event frame, only when a current event value is different than an immediately preceding event value: (1) executing read/write on the first-integral buffer to update the first integral of event data based on the current event value and all preceding event values, and (2) executing read/write on the second-integral buffer to update the second integral of event data based on at least the first integral of event data and the event frame count, and using at least the second integral of event data, deblurring the raw image data to yield a latent deblurred image.

2. The camera of claim 1, comprising: a pixel array having a plurality of pixels, the image-generation sensor being an image-generation subset of the plurality of pixels each designated to integrate the received light over the exposure interval, the event-detection sensor being an event-detection subset of the plurality of pixels being designated to output event data over the plurality of event frames.

3. The camera of claim 2, the event-detection subset comprising a plurality of event-detection subsets and the image-generation subset comprising a plurality of image-generation subsets, each image-generation subset corresponding to at least one row of the plurality of pixels.

4. The camera of claim 1, the image-generation sensor comprising a plurality of image-generation subsets;

the event-detection sensor comprising a plurality of event-detection subsets.

5. The camera of claim 4, wherein each subset of the plurality of event-detection subsets has same event frame quantity; a single count-buffer is used for analysis of event frames corresponding to more than one of the plurality of event-detection subsets.

6. The camera of claim 1, the latent deblurred image corresponding to beginning of the exposure interval.

7. The camera of claim 1, the latent deblurred image including a plurality of latent deblurred images corresponding to respective time of corresponding event frame in which event data value indicates an event occurred.

8. The camera of claim 1, exposure control of the image-generation sensor and the event-detection sensor being synchronized.

9. The camera of claim 1, wherein update the event-frame count comprises incrementally decreasing the frame count from a max frame count to zero.

10. The camera of claim 1, wherein update the frame count comprises incrementally increasing the frame count from zero to a max frame count.

11. A method for producing an image, comprising:

(a) receiving raw image data, captured using an image-generation sensor over an exposure interval;

(b) receiving event data, captured using an event-detection sensor over a plurality of event frames, each event frame corresponding to a period of the exposure interval;

(c) storing a plurality of event values in an event buffer, each event value corresponding to a respective event frame of the plurality of event frames based on the event data;

(d) for each event frame, updating an event-frame count of the plurality of event frames stored in a counter-buffer;

(e) when a current event value is different from an immediately preceding event value, (1) updating a first integral of event data using at least the current event value and all preceding event values, and (2) updating a second integral of event data using at least the first integral of event data and the event frame count; and (f) using at least the second integral of event data, deblurring the raw image data to yield a latent deblurred image.

12. The method of claim 11, wherein:

the image-generation sensor comprises a plurality of image-generation subsets, and the event-detection sensor comprises a plurality of event-detection subsets; and, a single count-buffer is used for analysis of event frames corresponding to more than one of the plurality of event-detection subsets.

13. The method of claim 11, the latent deblurred image corresponding to beginning of the exposure interval.

14. The method of claim 11, the latent deblurred image including a plurality of latent deblurred images each corresponding to respective time of the corresponding event frame.

15. The method of claim 11, further comprising synchronizing exposure control of the image-generation sensor and the event-detection sensor.

16. The method of claim 11, updating an event-frame count comprises incrementally decreasing the frame count from a max frame count to zero.

17. The method of claim 11, wherein updating first integral of event data using at least the current event value and all preceding event values comprises: summing the current event value and all preceding event values;

wherein each event value is one of a −1 for a negative change in light intensity detected by the event-detection sensor exceeding a threshold, a 0 for no change in light intensity detected by the event-detection sensor exceeding the threshold, and a +1 for a positive change exceeding the threshold in light intensity detected by the event-detection sensor.

18. The method of claim 11, wherein updating the second integral of event data comprises calculating:

$$\mathrm{acc}(t) = \mathrm{event}(t)! = 0?\mathrm{acc}(t-1) + \mathrm{dn\_count}(t)*$$
$$(2^{c'E(t)} - 2^{c'E(t-1)}):\mathrm{acc}(t-1)$$

where c' is a contrast threshold that defines whether an event occurs in the event data, t is the frame count, and E(t) is the first integral of event data.

19. The method of claim 11, wherein deblurring the raw image data to yield a latent deblurred image includes, calculating expected intensity value of each pixel in the deblurred image corresponding to time (t) based on $$L(t) = L(0) * \exp^{cE(t)};$$

$$\text{where } L(0) = BT' * \left( \int_0^T 2^\wedge (c'E(t)) dt \right)^{-1} = BT' * acc(T)^{-1};$$

5 where BT' is the value of pixel in the raw image data at end of exposure time T', and c' is a contrast threshold,

10

$$acc(t) = \int_0^\infty 2^\wedge (c'E(s)) ds, \text{ and } E(t) = \int_0^t e(s) ds.$$

20. The method of claim 11, further comprising repeating (a)-(f) over additional exposure intervals to yield additional latent deblurred images; and combining the latent deblurred image and the additional latent deblurred images into a video stream.

15

\* \* \* \* \*